United States Patent [19]
Böttger

[11] Patent Number: 6,037,035
[45] Date of Patent: Mar. 14, 2000

[54] SPACER FABRIC

[75] Inventor: Wolfgang Böttger, Ködnitz, Germany

[73] Assignee: Vorwerk & Co. Interholding GmbH, Wuppertal, Germany

[21] Appl. No.: 08/702,603

[22] PCT Filed: Feb. 13, 1995

[86] PCT No.: PCT/EP95/00518

§ 371 Date: Oct. 29, 1996

§ 102(e) Date: Oct. 29, 1996

[87] PCT Pub. No.: WO95/23251

PCT Pub. Date: Aug. 31, 1995

[30] Foreign Application Priority Data

Feb. 23, 1994 [DE] Germany ............... 44 05 772
Apr. 7, 1994 [DE] Germany ............... 44 11 931

[51] Int. Cl.[7] .................. B32B 3/12; B32B 3/02
[52] U.S. Cl. ............. 428/116; 428/85; 428/90; 428/91
[58] Field of Search ............. 428/116, 85, 90, 428/91

[56] References Cited

U.S. PATENT DOCUMENTS 3,013,588 12/1961 Klingberg.

FOREIGN PATENT DOCUMENTS

| | | |
|---|---|---|
| 0299308 | 1/1989 | European Pat. Off. |
| 0392939 | 10/1990 | European Pat. Off. |
| 0475000 | 3/1992 | European Pat. Off. |
| 8903440 | 5/1989 | Germany. |
| 8902259 | 4/1990 | Germany. |
| 3902940 | 8/1990 | Germany. |
| 9103282 | 6/1991 | Germany. |
| 9006957 | 10/1991 | Germany. |
| 9007289 | 10/1991 | Germany. |
| 4100738 | 7/1992 | Germany. |
| 9217661 | 10/1992 | WIPO. |
| 9303235 | 2/1993 | WIPO. |

OTHER PUBLICATIONS

Patent Abstracts of Japan, vol. 18 No. 82 (C–1164) Feb. 10, 1994 & JP,A,05 287636 (Advance Kyodo Kumiai) Nov. 2, 1993.

Database WPI Week 9348 Derwent Publications Ltd., London, GB; AN 93–383645 & JP,A,05.287 679 (Unitika), Nov. 2, 1993.

Primary Examiner—Blaine Copenheaver
Attorney, Agent, or Firm—Martin A. Farber

[57] ABSTRACT

A spacer fabric, in particular a velour fabric, having a first layer (1) and a second layer (2) and pile threads (4, 5, 6, 7) joining the layers (1, 2) together. To obtain such a spacer fabric in particular as a basis for the production of a building component formed therefrom by resinification, in which despite increase in strength there is the least possible increase in total weight and/or in which there is achieved as simple and effective as possible processing having regard to resinification, between the layers (1, 2) and joined to or starting from the freely floating pile threads (4, 5, 6, 7), there are provided branches running in weft and/or in warp direction, which branches, in so far as they are woven, are accommodated in a cross-over region between two pile threads (4, 5, 6, 7), each of which alternates from layer to layer (additional weft threads), or runs alternately around neighbouring additional weft threads (additional warp threads).

29 Claims, 20 Drawing Sheets

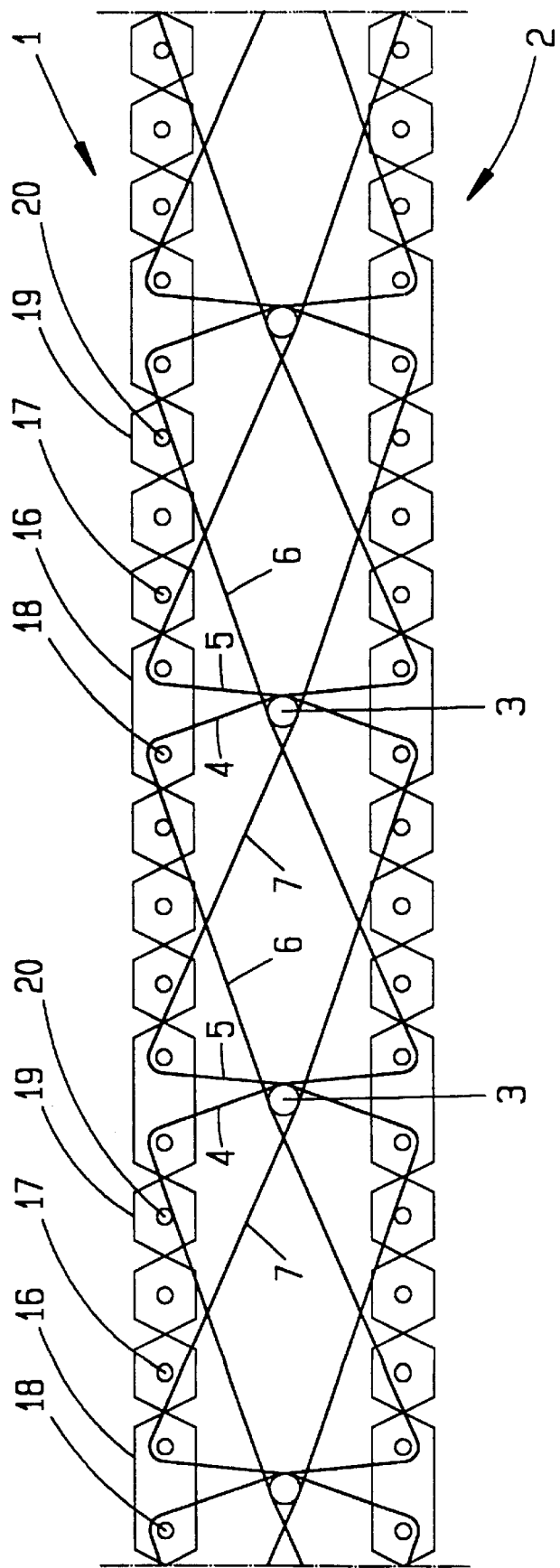

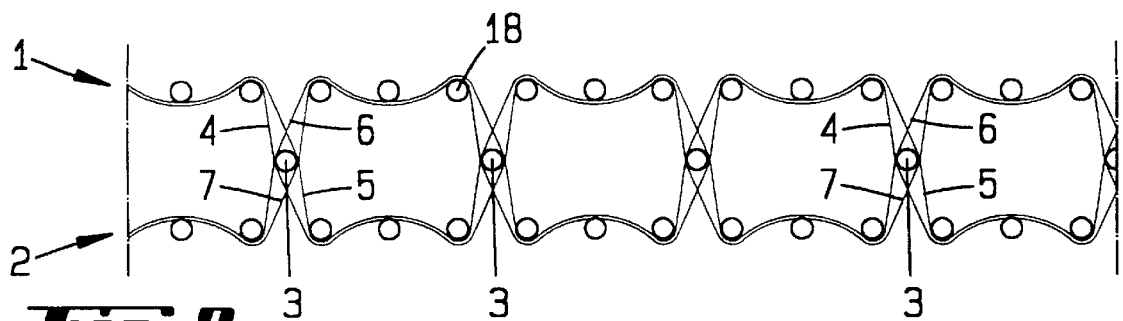
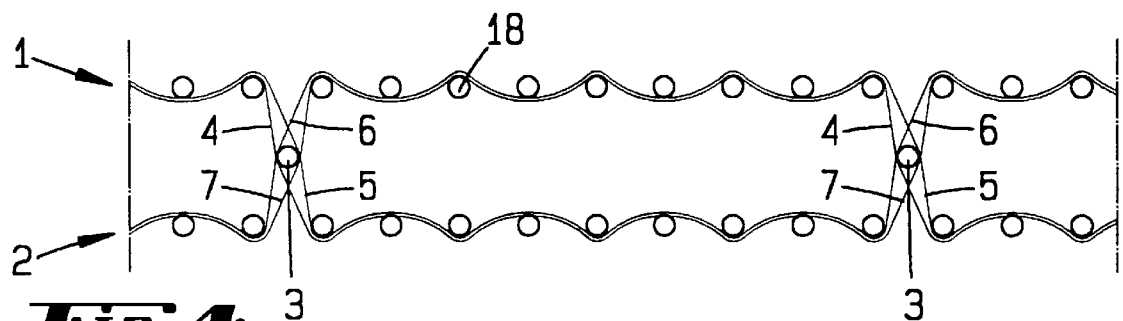
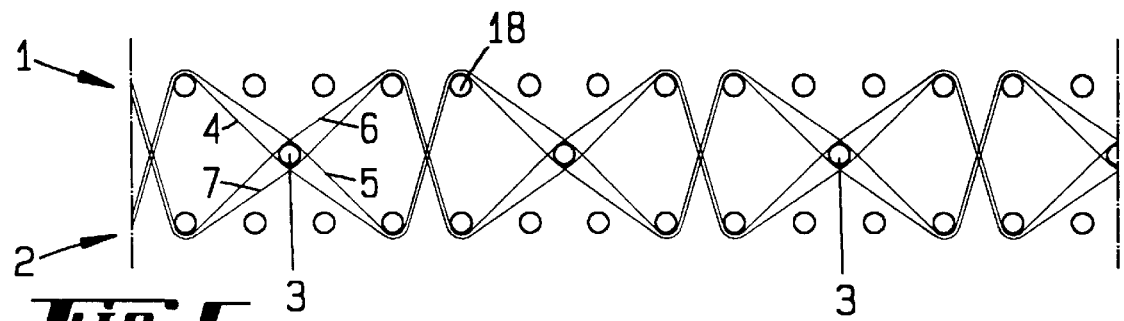
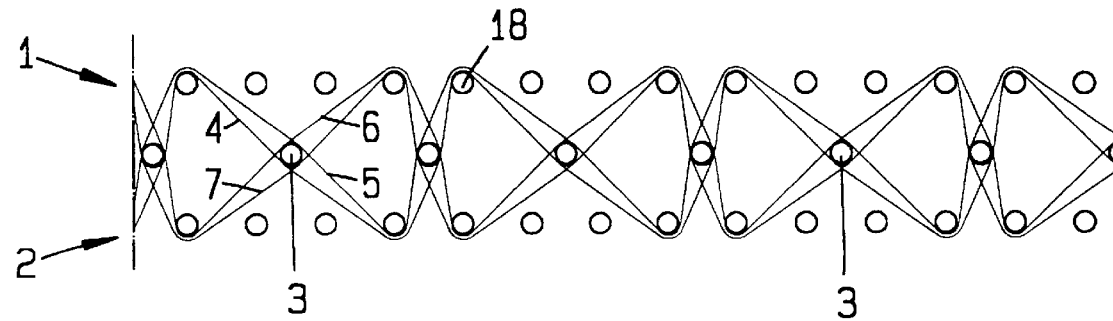

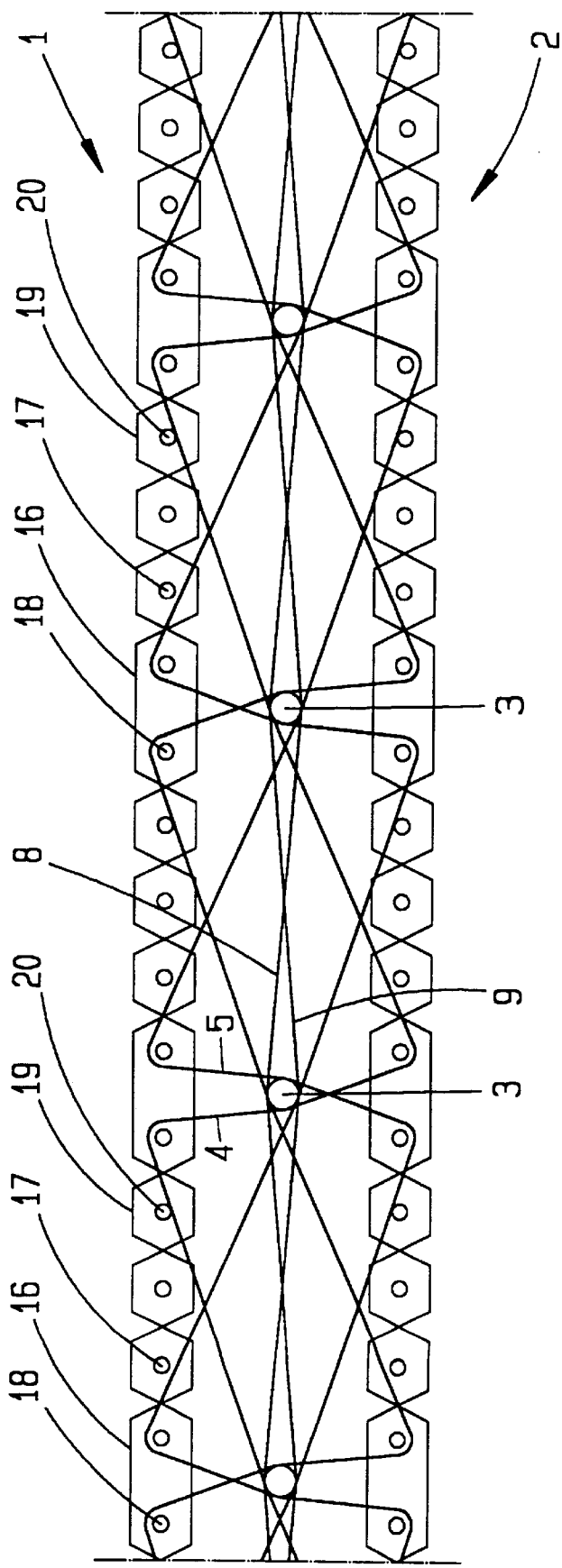

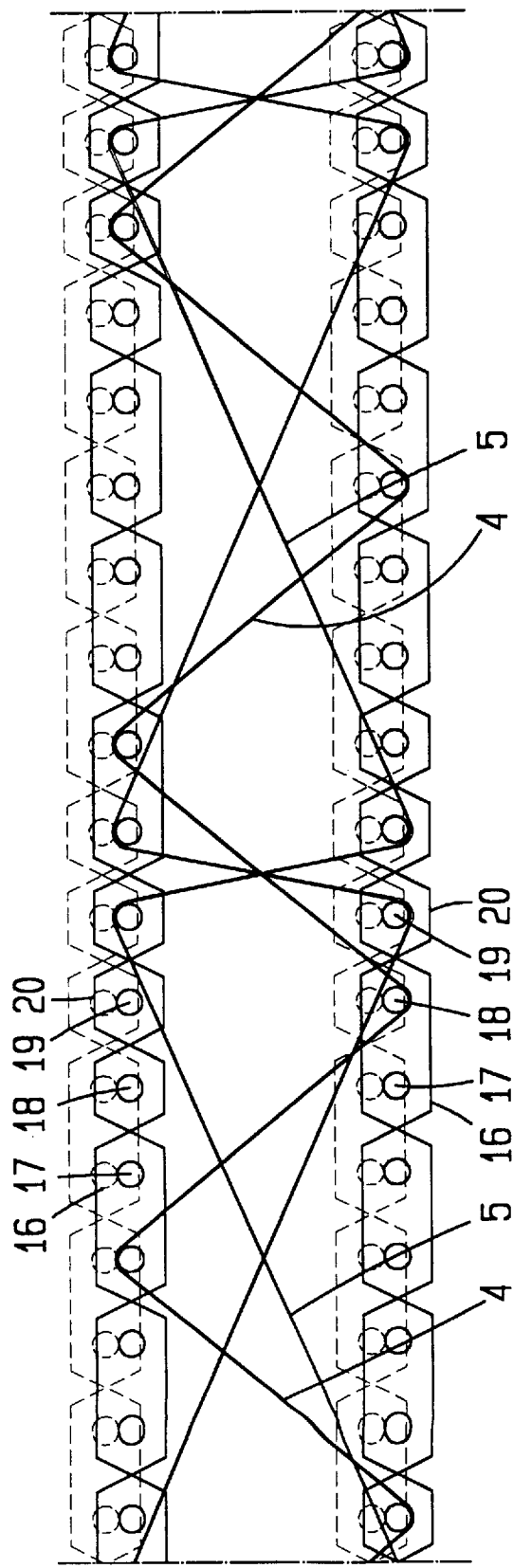

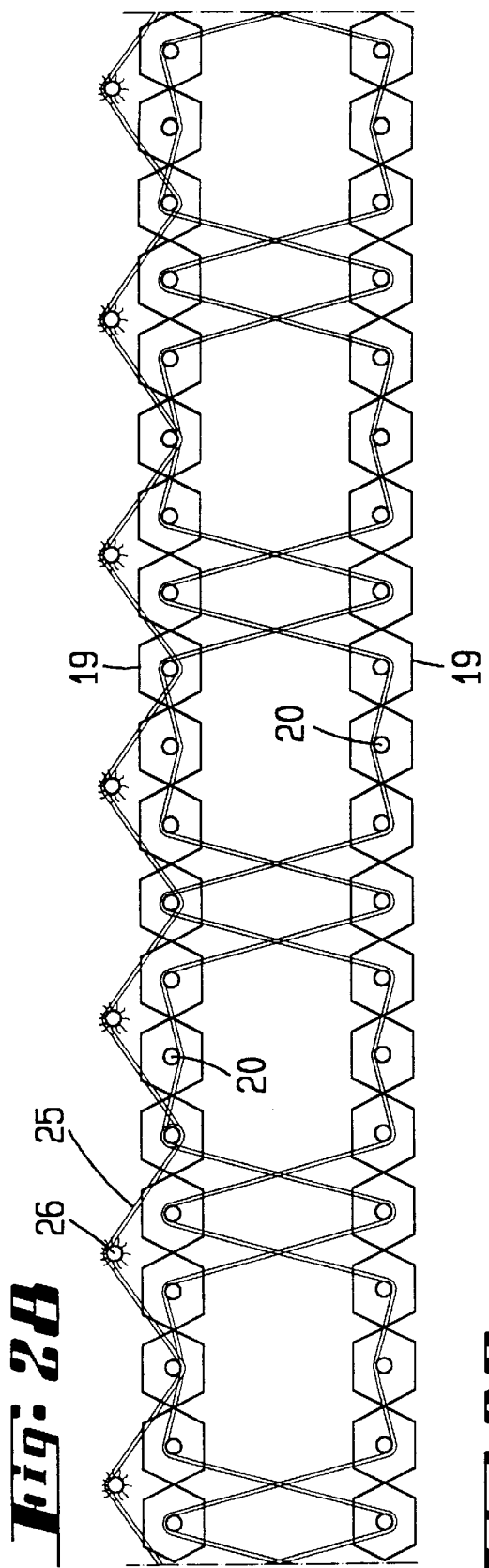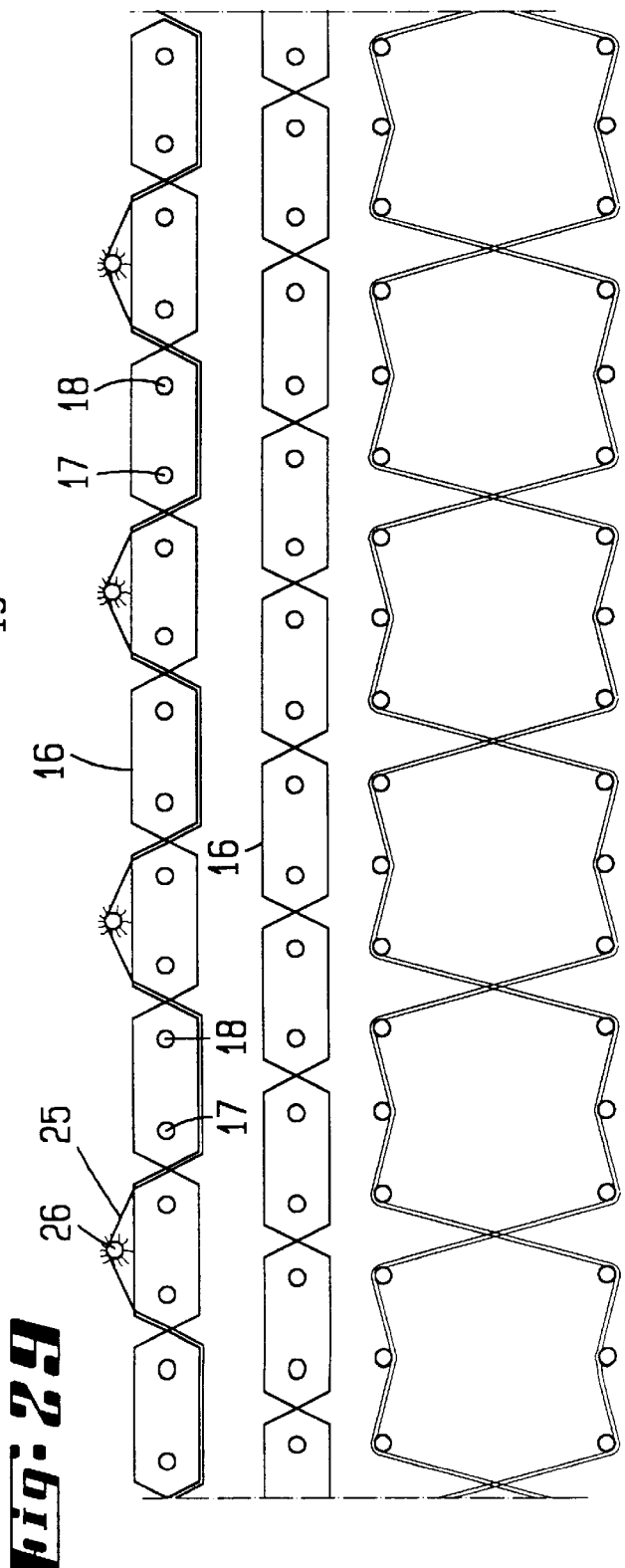

SPACER FABRIC

FIELD AND BACKGROUND OF THE INVENTION

The invention relates to a spacer fabric, in particular a velour fabric, having a first and a second layer and linking pile threads. The invention further relates also to a building component on the basis of the spacer fabric, in particular on a velour fabric basis.

Spacer fabrics such as these and building components produced from them by resinification have already become known in various embodiments and for different purposes of use.

Initially, reference with regard to the state of the art is made to EP-B1 299 308. Further reference is also made to DE-A1 41 00 738. The content of these two printed publications is incorporated as to their full contents in the disclosure content of the present application, in such a way that features of these printed publications may be also included in combination as features in claims presented herein. Use in a floor covering of such a fabric or of a resinified building component produced accordingly is further known from EP-A2 475 000. WO93/03235 describes use in house building of a building component produced on the basis of such a fabric. Reference with regard to the state of the art is further made, for example, to DE-A1 39 02 940 and the documents filed on DE-GM 90 06 957, 90 07 289, 91 03 282, 89 02 259 and 89 03 440.

In particular in a velour fabric, such as is known from initially mentioned EP-B1 299 308, the arrangement of the intermediate elements having their origin in the pile threads which freely floatingly join together the layers of the multilayer fabric, has proven very advantageous in the resinified state. On the one hand, the intermediate elements have, on account of the resinification, a pedestal-type transition to the top and to the bottom layer respectively and are moreover, for figure-eight-shaped central twisting, normally further joined together by the resinification, so that they are formed to be relatively rigid. There exists, however, a further need to increase the strength of such building components and to provide a spacer fabric suitable for the purpose. While the strength may be controlled by the proportion of resin which remains in the fabric on resinification, the weight of a building component produced in such a manner also increases correspondingly with this at the same time.

With regard to such a building component, in particular the production of such a building component, the resinification is of particular importance. In this connection, it is usual to proceed in such a manner that resin is applied to the fabric, or that the fabric is impregnated with resin and an excess of resin is then pressed out, in order to release the restoring forces of the pile threads, by which the desired, spaced form of the layers is produced, and, after hardening of the resin, the intended building component. In particular, it is also known for this purpose to spray a fabric with resin. As soon as the critical quantity of resin relative to the fabric is reached through impregnation, there ensues precisely the aforementioned desired spacing of the layer. However, alternative possible methods of resinification are also still sought beyond the foregoing.

SUMMARY OF THE INVENTION

Having regard to the state of the art as cited above, the invention therefore faces the technical problem of providing a spacer fabric, in particular as a basis for the production of a building component formed from the fabric by resinification, which, despite increase in strength, has the least possible increase in total weight and/or is to be processed as simply and effectively as possible in respect of resinification.

This problem is solved initially in the manner between the layers and joined to or starting from the freely floating pile threads, there are provided branches running in weft and/or warp direction, which branches, in so far as they are woven, are accommodated in a cross-over region between two pile threads, each of which alternates from layer to layer (additional weft threads), or runs alternately around neighbouring additional weft threads (additional warp threads). This teaching is based on the knowledge that by an increase in the bracing between the layers, there may be achieved an increased strength, if this bracing—ultimately formed in the building component by resin strands or resin coating—has its origin in structures which are already provided by weaving in the process of manufacture of the fabric. For this purpose, it may already be provided in manufacture, for example, at least with regard to the pile threads, that these pile threads have naps or loops, or may perhaps be textured, may comprise a fancy or effect yarn or the like. By this means there are produced, in particular in the freely floating region between the layers, branchings protruding from the intermediate elements, which branchings may be branch-like, for example, and—without being joined together by weaving technique—produce cross-overs and overlaps with corresponding branches of neighbouring pile threads, so that in the (hardened) resinified state, there may develop, in addition to the intermediate elements, a lattice, as it were—between the layers—of resinified threads or thread portions. In this connection, it is also of particular importance, as follows also from the literature to which reference was made at the beginning, that a spacer fabric such as this comprise high-strength yarns such as aramide yarns, carbon fibre, ceramic fibre, or in particular glass fibre. In a further embodiment, it is provided that branches also have their origin in or are joined to the ground warp and/or the weft material. The foregoing proves advantageous in particular with regard to the inner surfaces of the layers of the spacer fabric, since by this means there are obtained reinforced pedestal-type transition regions in the region of the intermediate elements. A further measure, possible in combination or as an alternative, in order to achieve the desired reinforcement, consists in weaving additional weft threads between the layers of the spacer fabric. In this connection, these additional weft threads are preferably woven in the cross-over regions of the pile threads which float between the layers. Irrespective of these additional weft threads, however, there remains intact the ground pattern of, for example, a velour fabric. No woven bridges are produced between the layers of the spacer fabric. The additional weft threads may be fixed in particular by the pile threads alternating from above to below and vice versa before and after the weft. Moreover, additional warp threads may also be woven between the layers of the spacer fabric. Altogether, there is thereby inserted and fixed by weaving technique, between the top layer and the bottom layer of the spacer fabric, the structure of a lattice, as it were, formed from the weft and warp threads which cross one another.

Having regard to simpler processing, this embodiment leads also to the further subject matter of the invention, a method for the formation of a building component on the basis of a spacer fabric, in particular a velour fabric, preferably a fabric in one of the embodiments as discussed above and below, whereby through resinification there is achieved a spaced, substantially rigid construction. The invention provides that the resinification is executed by melting of additional thermoplastic fibres incorporated, in particular woven, into the skeletal structure of the spacer fabric. In regard to this subject matter, the aforementioned fibres, respectively additional warp threads or additional weft threads, are formed of a thermoplastic fibre, which has a lower melting point than the material of the ground fabric, that is, the ground warp and the ground weft threads as also the pile threads. In particular by the introduction of such additional yarn portions in the intermediate space between the two layers, there is created a suitable storage space to bring this additional material to melting point by appropriate heating and thereby to achieve the resinification of the spacer/ground fabric. It is essential that practically no portions of the ground fabric itself are woven of thermoplastic fibres of such kind. By the application of heat, there is thus no producing, in the layers—and also with regard to the pile threads—of defective points which could result in holes or weakenings. With regard to such thermoplastic fibres, a great many are known in the state of the art, for example such as polystyrene, polyethylene or polypropylene. In this connection, a subject of the invention is also an associated spacer fabric, in particular a velour fabric, having a first and a second layer, which are formed of a ground warp and of a ground weft, and pile threads joining the layers together, in which between the layers and joined to or having their origin in the freely floating pile threads, there are branches running in weft and/or warp direction, which branches comprise a thermoplastic fibre material which has a lower melting point than the ground warp, the ground weft or the pile threads. By the proportion of these thermoplastic fibres, the degree of resinification may at the same time be very finely controlled.

Also in regard to the further subject matter of the invention, the building component on the basis of a spacer fabric, such as in particular a velour fabric, as also has in particular been described initially, this building component comprises at least a first and a second layer and intermediate elements in the form of intermediate cross-members linking these layers, as is described in particular in EP-B1 299 308 already referred to several times. There are provided, in a building component produced in such manner, branch elements having their origin in the intermediate elements, which branch elements are substantially laterally oriented and form a bridge to a neighbouring intermediate element. As already described with regard to the basic fabric, these bridges are also realised by as it were an opposing fibre portion from the neighbouring intermediate element. Correspondingly, these branch elements are determined by the yarn used, whereby as a basis, there serve threads with naps, loops, textured threads or threads produced by the fancy twist method. In addition, the basis for this in the building component also is the additional warp and additional weft threads in combination or as alternative, as already described as far as weaving is concerned. A particular embodiment is furthermore provided in combination or as alternative in that the intermediate cross-members comprise not only, as described and represented in EP-B1 299 308, helically twisted threads or in particular resinified threads arranged in figure-eight-shape to one another, but in that double threads and corresponding double cross-members are provided in respect of a thread cross-member of an intermediate element. Instead of a figure-eight configuration, there then appears a double figure-eight configuration. Also in the crosswise-running thread cross-members, there is provided, as a result, a doubling of the thread cross-members from two to four, which furthermore preferably run curved in such a way that they leave between one another, for example, an opening formed to extend in crescent shape, bounded by two curved lines.

BRIEF DESCRIPTION OF THE DRAWING

FIG. 1–5 show weaving schemes of a velour spacer fabric with in each case one additional weft thread in the cross-over region of four pile threads;

FIG. 6–10 show fabric schemes according to FIGS. 1 to 5, with additionally two warp threads;

FIG. 27 shows again a further weaving scheme which is of advantage with regard to impregnation with resin;

FIG. 28 shows a weaving scheme with top-side weft threads which have a structured surface;

FIG. 29 shows a representation according to FIG. 28, with a different weaving scheme;

DETAILED DESCRIPTION OF THE PREFERRED EMBODIMENTS

Figure 7:
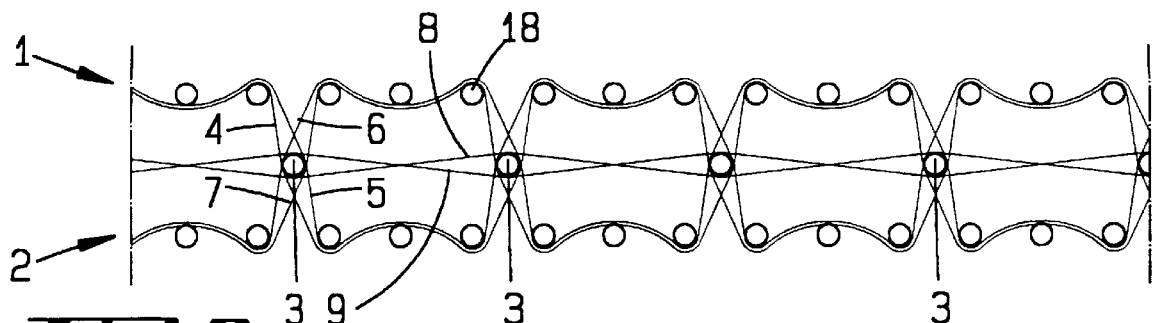

There is represented and described - initially with reference to FIG. 1—a weaving scheme for a velour fabric, in which additional weft threads 3 are woven in between the layers 1 and 2. In the embodiment, the additional weft threads 3 are each woven in in the cross-over region of the pile threads 4, 5, 6 and 7, in such way that they are simultaneously held in place. The pile threads 4 to 7 each alternate from top to bottom, but do not surround the additional weft threads 3 in the process. By this means, the additional weft threads 3 are fixed at the spacing midpoint. The free length of the pile threads 4 to 7 between the layers 1 and 2 is in each case virtually halved by this, but without the pile threads effecting, between layers 1 and 2, a full encirclement around an additional thread.

For the rest, the pile threads 4 to 7 each run in layers 1 and 2 respectively into sheds 16, in which there are accommodated two weft threads 17, 18. Between the sheds 16, there are in each case provided three further sheds 19, in each of which is accommodated a single weft thread 20. The sheds 19 are thus each skipped by the pile threads 4 to 7, while in the sheds 16, two pile threads are always placed about one weft thread 17 or 18 and then run again to the other layer 1 or 2 respectively.

In FIGS. 2 to 10, the layers 1, 2 are each indicated only with regard to the weft threads. The warp threads are not represented.

While in the weaving scheme according to FIG. 1, only the pile threads 4 and 5 run respectively above or below the weft thread 3 into a shed 16, there run, in the weaving scheme according to FIG. 2, all four pile threads each into a shed 16 located respectively above or below. As for the rest, there are provided, in the scheme according to FIG. 2, respectively a shed 16 and a shed 19 alternatingly beside one another in the layers 1 and 2.

The weaving scheme of FIG. 3 corresponds to the weaving scheme of FIG. 2, with the difference that there are provided, between two sheds 16, seven intermediate sheds 19.

The weaving scheme of FIG. 4 is a further development of the weaving scheme of FIG. 2, in which however the pile threads, after they are brought about a weft thread 18 in a shed 16, run again to the respective other layer, the weft thread 3 being woven in at their cross-over point. No weft thread 3 is woven in at that cross-over of the pile threads at which the latter alternate directly between two sheds 16. As for the rest, two sheds 19 are provided between each two sheds 16.

Figure 22:
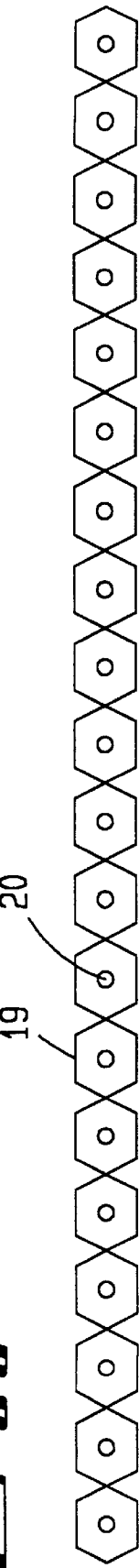
FIG. 22–24 show possible variations with regard to the ground warps applicable to all of the weaving schemes represented.
Figure 23:
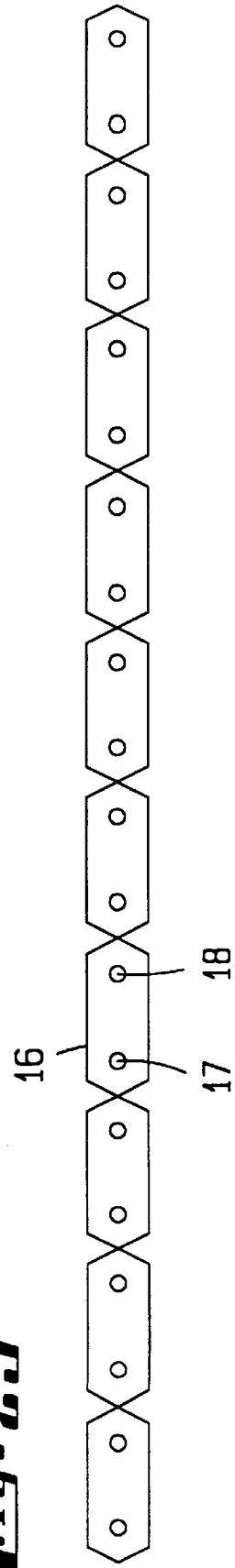
Figure 24:
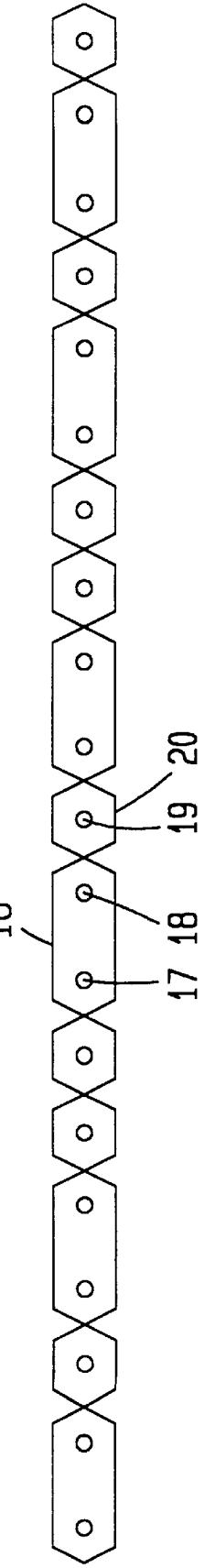

Also possible without further consideration are other ground weaves on the basis of, in particular, linen weave and body weave as well as derivatives from these. To demonstrate variants here, reference is made in particular to FIGS. 22 to 24. While FIG. 22 shows individual sheds 19 each with a single weft thread 20, FIG. 23 shows a weave in which two weft threads 17, 18 each lie in one shed 16, and FIG. 24 shows such a weave in which intermediate sheds 16 having two weft threads 17, 18 and sheds 20 having one weft thread 19 are arranged, alternately one and two of these sheds 16 and 19.

The weaving scheme of FIG. 5 corresponds to that of FIG. 4, with the difference that now also, corresponding to FIG. 2, there is woven in a weft thread 3 at the cross-over of the pile threads 4 to 7, where the latter alternate directly between two sheds 16.

In the weaving scheme according to FIG. 6, there are provided, in addition to the additional weft threads 3, additional warp threads 8, 9. Otherwise, the same conditions apply here with regard to the weft sheds 16 and 19 as for the weaving scheme of FIG. 1.

In FIGS. 7 to 10, an abstract form of representation is again selected.

The weaving scheme of FIG. 7 corresponds to that of FIG. 2, but here also there are provided the two extra additional warp threads 8, 9.

Figure 8:
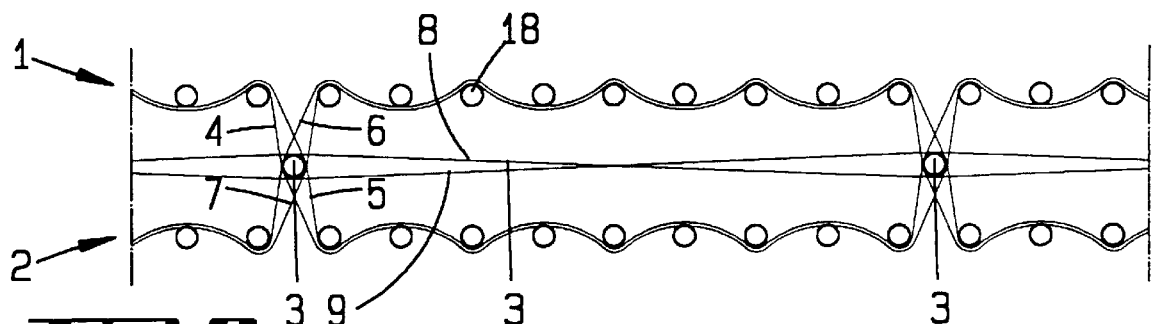

The weaving scheme of FIG. 8 corresponds to that of FIG. 3, here also there being now provided the two additional warp threads 8, 9.

Figure 9:
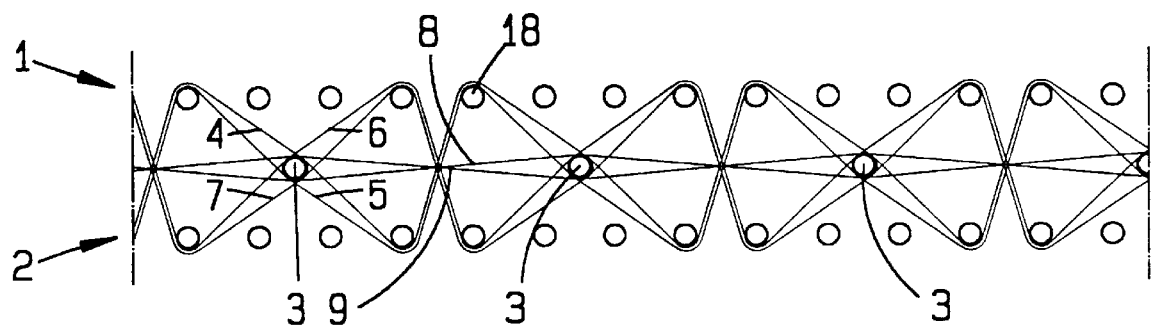
Figure 10:
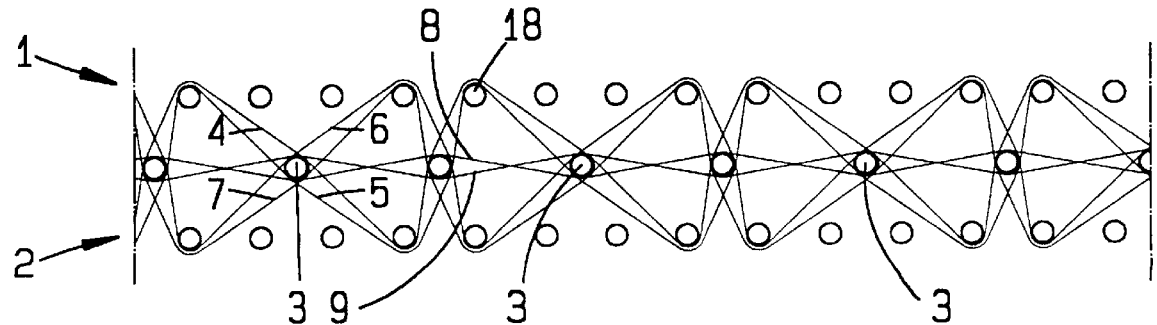

In like manner, the weaving scheme of FIG. 9 corresponds to that of FIG. 4 and the weaving scheme of FIG. 10 to that of FIG. 5.

Figure 11:
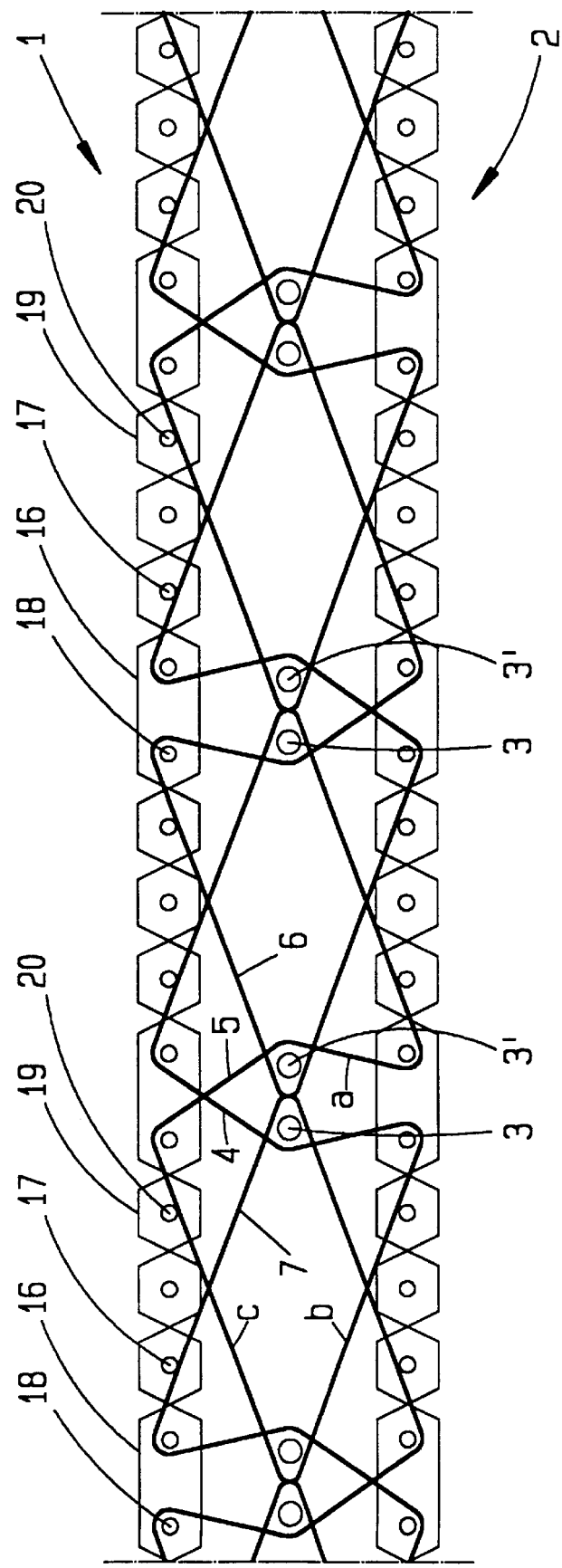
FIG. 11 shows a weaving scheme according to FIG. 1, but with two additional weft threads, which are each bound in between the cross-over regions of three pile threads.

The weaving scheme of FIG. 11 originates from a weaving scheme according to FIG. 1, but here, in a cross-over region of the pile threads 4 to 7, there are incorporated respectively two additional weft threads 3, 3'.

Figure 12:
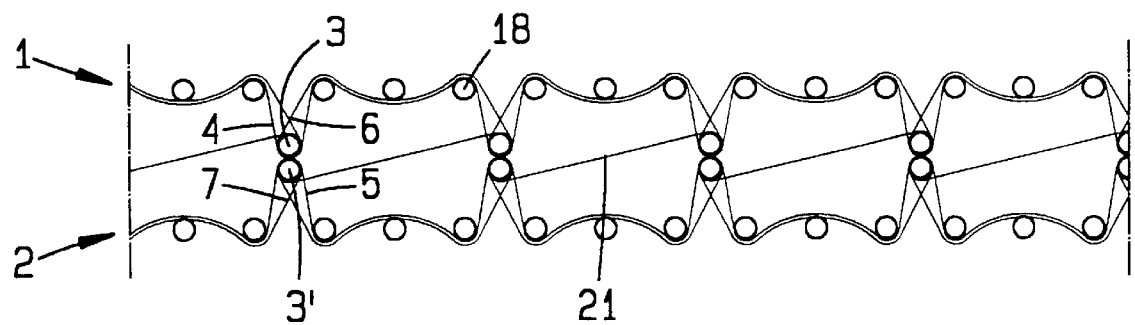
FIGS. 12, 13 show modifications of the weaving scheme according to FIG. 11.

The weaving scheme of FIG. 12 corresponds to that of FIG. 2, but here there is incorporated one additional warp thread 21 which alternates S-shaped between two superimposed additional weft threads 3, 3'. The additional warp thread thus encircles respectively half of the additional weft thread 3 and half of the additional weft thread 3', then to run, without entering into the layer 1 or 2, to the next additional weft thread 3.

Also the pile threads 4 to 7 alternate in this weaving scheme, each S-shaped in regard to the additional weft threads 3, 3'.

Figure 13:
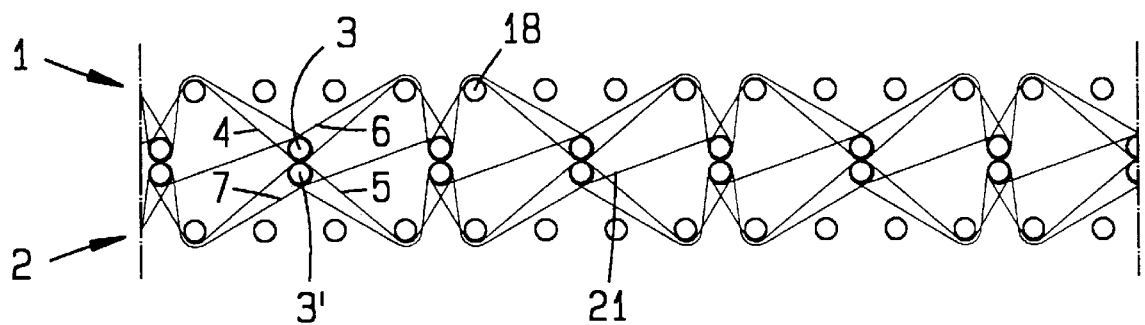

The weaving scheme of FIG. 13 corresponds to that of FIG. 4, but here also there are provided respectively two additional weft threads 3, 3', with S-shaped alternating of the pile threads 4 to 7 about these additional weft threads 3, 3', as explained above having regard to the weaving scheme of FIG. 12, and with an additional warp thread 21 which, in like manner as explained above with regard to the weaving scheme of FIG. 12, alternates S-shaped in regard to the additional weft threads 3, 3'.

Figure 14:
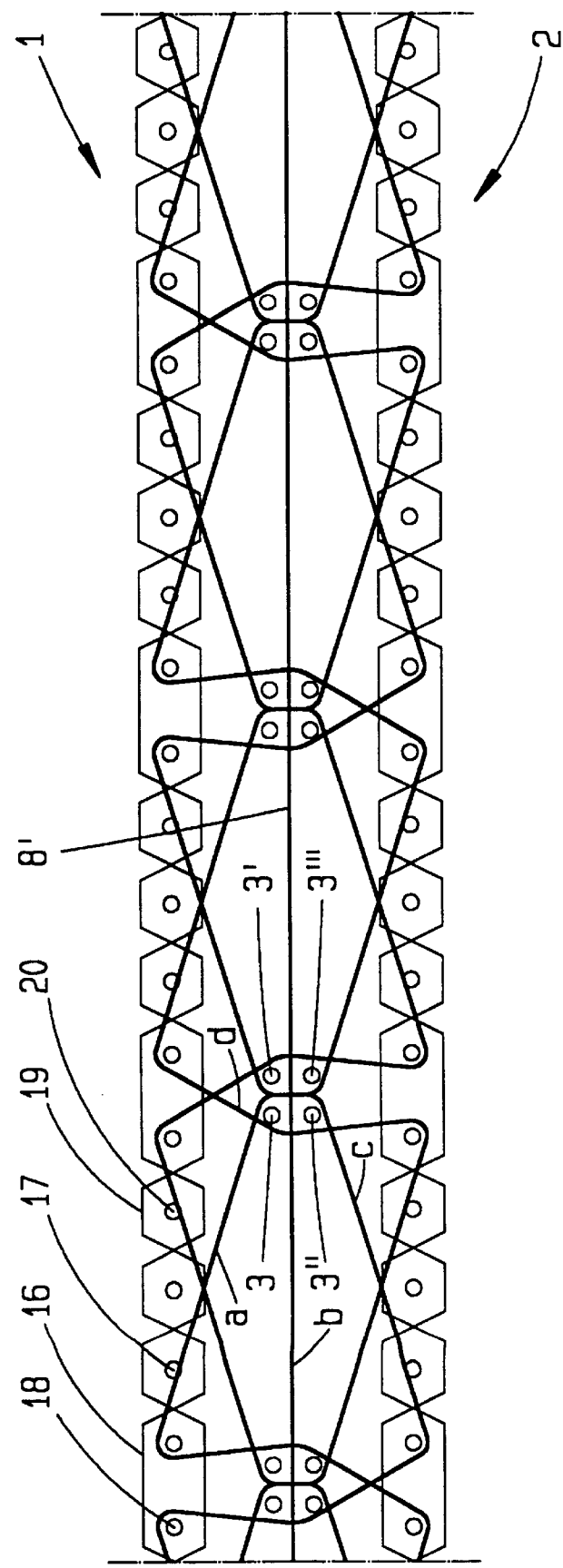
FIG. 14 shows a weaving scheme according to FIG. 2, with one additional warp thread, but four additional weft threads.
Figure 15:
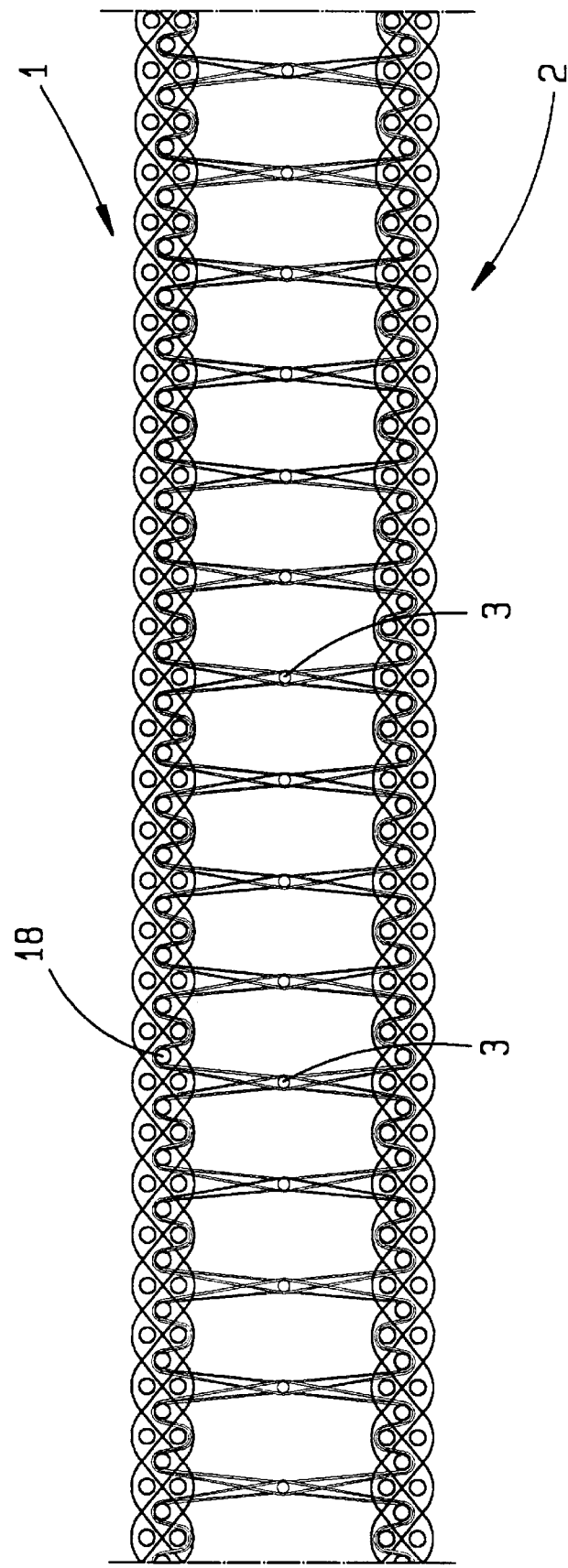
FIG. 15 shows a weaving scheme corresponding to the weaving scheme of FIG. 1, but modified with a view to a flexible fabric.

In the weaving scheme of FIG. 14, there are provided four additional weft threads 3, 3', 3" and 3''' and moreover one further additional warp thread 8' running between the additional weft threads 3 and 3''' or 3" and 3''' respectively. As for the rest, the weaving scheme of FIG. 14 corresponds to that of FIG. 11.

Figure 16:
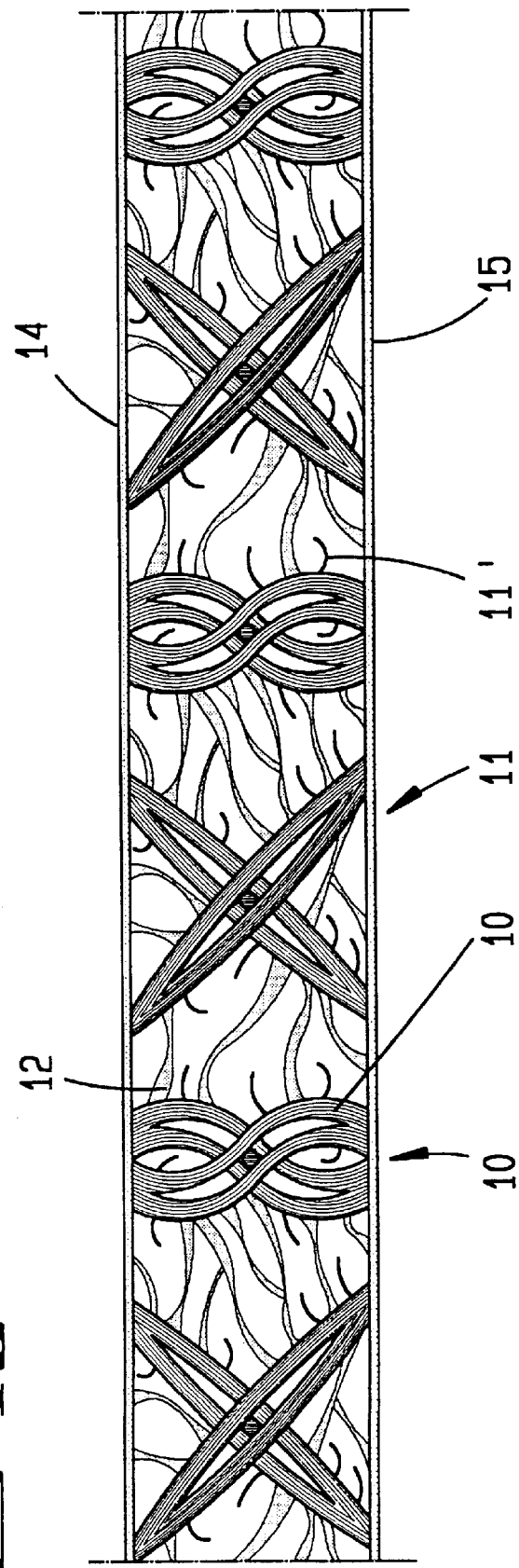
FIG. 16 shows a schematic representation of a hardened building component with intermediate bridges between the intermediate elements.

In regard to the building component produced on the basis of a fabric, formed in particular in one of the manners specified above, there is represented in FIG. 16, in somewhat stylised form, a cross-section through a building component, in which there are provided substantially figure-eight-shaped intermediate elements 10 having thread cross-members 10' and cross-shape-formed intermediate elements 11 having thread cross-members 11'. In the representation according to FIG. 16, there is already represented respectively a double-cross-member embodiment, both for the figure-eight-shaped intermediate cross-members 10 and for the cross-shape-formed intermediate elements 11. A single cross-member embodiment may also be used here, as represented and described in principle in EP-B1 299 308 already cited several times. Between previously associated thread cross-members of the double cross-member embodiment, there are produced crescent-shaped openings which, after resinification, may each also be sealed by a resin skin.

Essential in the representation according to FIG. 16 are the intermediate bridges 12, which develop between the intermediate elements 10 and 11. These intermediate bridges 12 are obtained by use of a special effect yarn. This effect or fancy yarn may have, for example, naps or loops, or be textured or be produced by the fancy twist method. All of this being in technical yarns which are listed in detail at the beginning. With regard to the naps, it may also be provided, as is known per se from, for example, utility model 90 07 289, that they be supported by inserted threads. In the resinified state, there are then produced between the intermediate elements 10 and 11 precisely the intermediate bridges 12.

Figure 17:
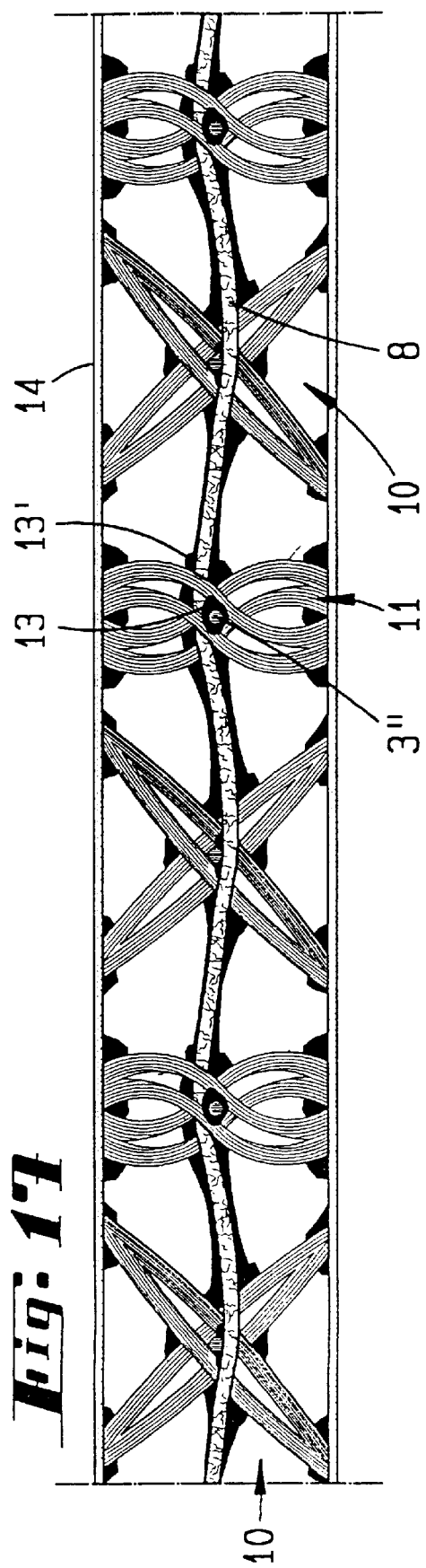
FIG. 17 shows a cross-sectional representation of a building component on the basis of a fabric with additional warp and additional weft threads.

In FIG. 17, there is represented a resinified building component on the basis of a fabric with additional weft threads and additional warp threads. Here also, there is to be recognised the double embodiment of the cross-shaped intermediate elements 10 and the substantially figure-eight-shaped intermediate elements 11. It is furthermore represented that there is developed about the additional weft threads 3" and the additional warp threads 8 respectively a covering 13 and 13' of hardened resin, which is thicker at the cross-over regions of the pile threads and is normally at its thinnest at the middle of the free-standing intermediate bridge portion 12. Altogether, there is provided by this means an intermediate cross-member portion which joins together neighbouring intermediate elements 10, 11 in warp and/or in weft direction between the layers 14, 15.

Figure 18:
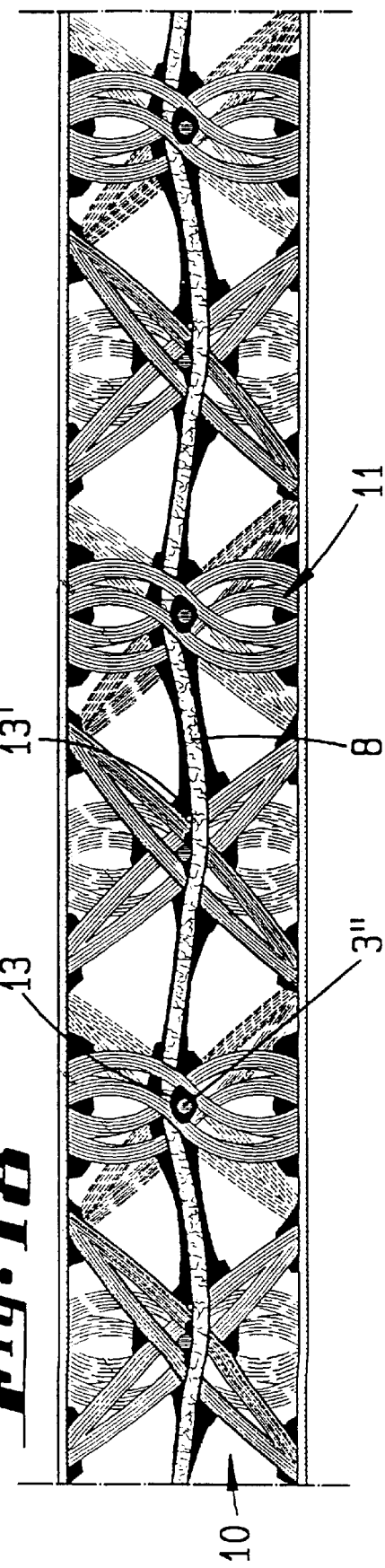
FIG. 18 shows a cross-sectional representation according to FIG. 17, in which cross-shaped and figure-eight-shaped intermediate elements alternate with one another.

In the representation according to FIG. 18, the laid-down base fabric is provided in such way that, in the building component, cross-shaped and figure-eight-shaped intermediate elements 10 and 11 alternate one after the other, perpendicular to a plane in which these intermediate elements extend.

Figure 19:
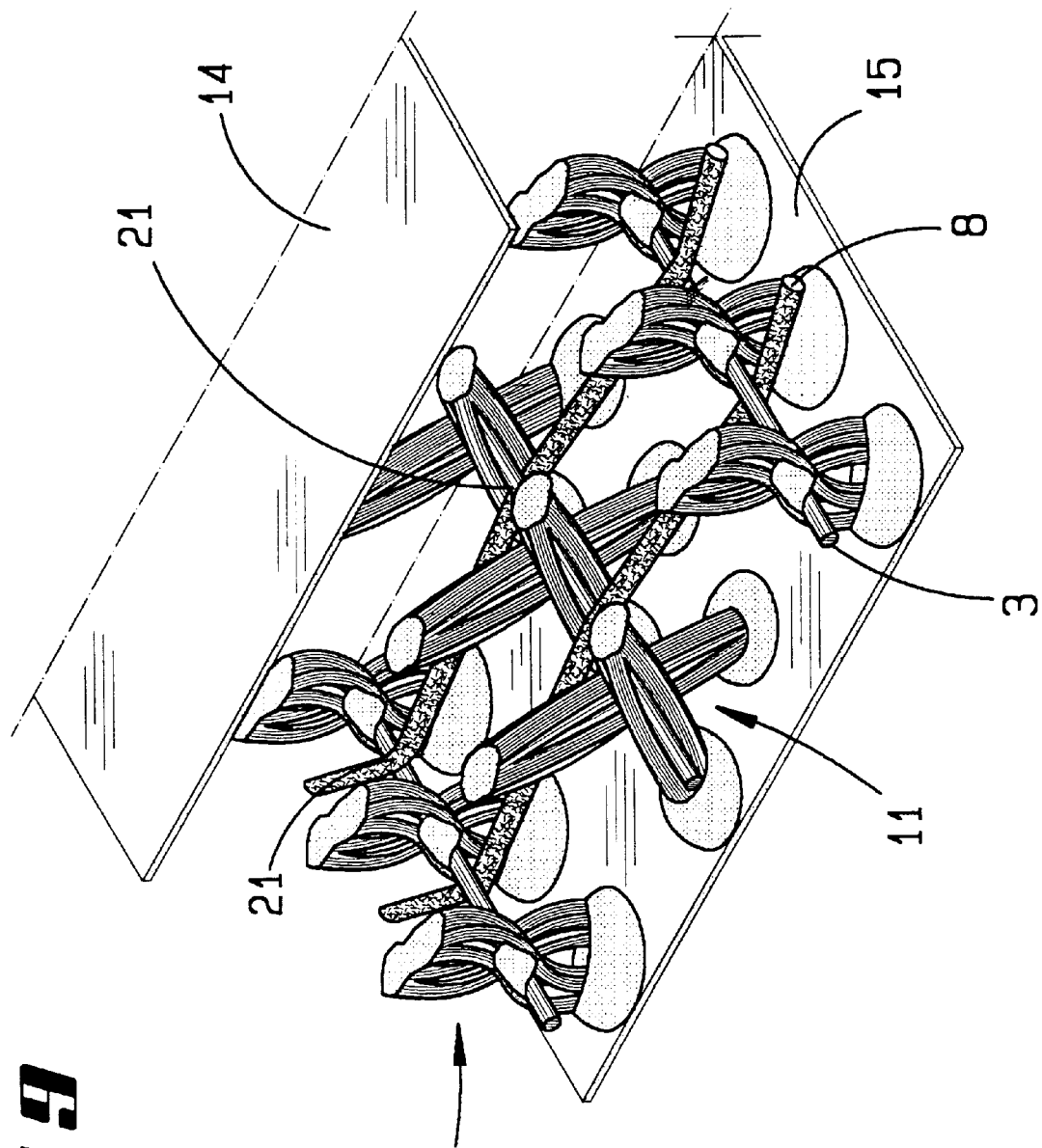
FIG. 19 shows a perspective, partially cut-away view of a building component according to FIG. 16.

From the perspective representation according to FIG. 19, it becomes particularly clear that the additional warp threads 8 and the additional weft threads 3—in themselves—define an intermediate lattice between the top and bottom layers 14, 15 of the resinified building component, with cross-over points 21, which are respectively disposed between figure-eight-shaped or cross-shaped structures of the intermediate elements 10, 11, located one after the other. Moreover, the intermediate lattice is naturally anchored also in the intermediate elements in each case by resinification.

Figure 20:
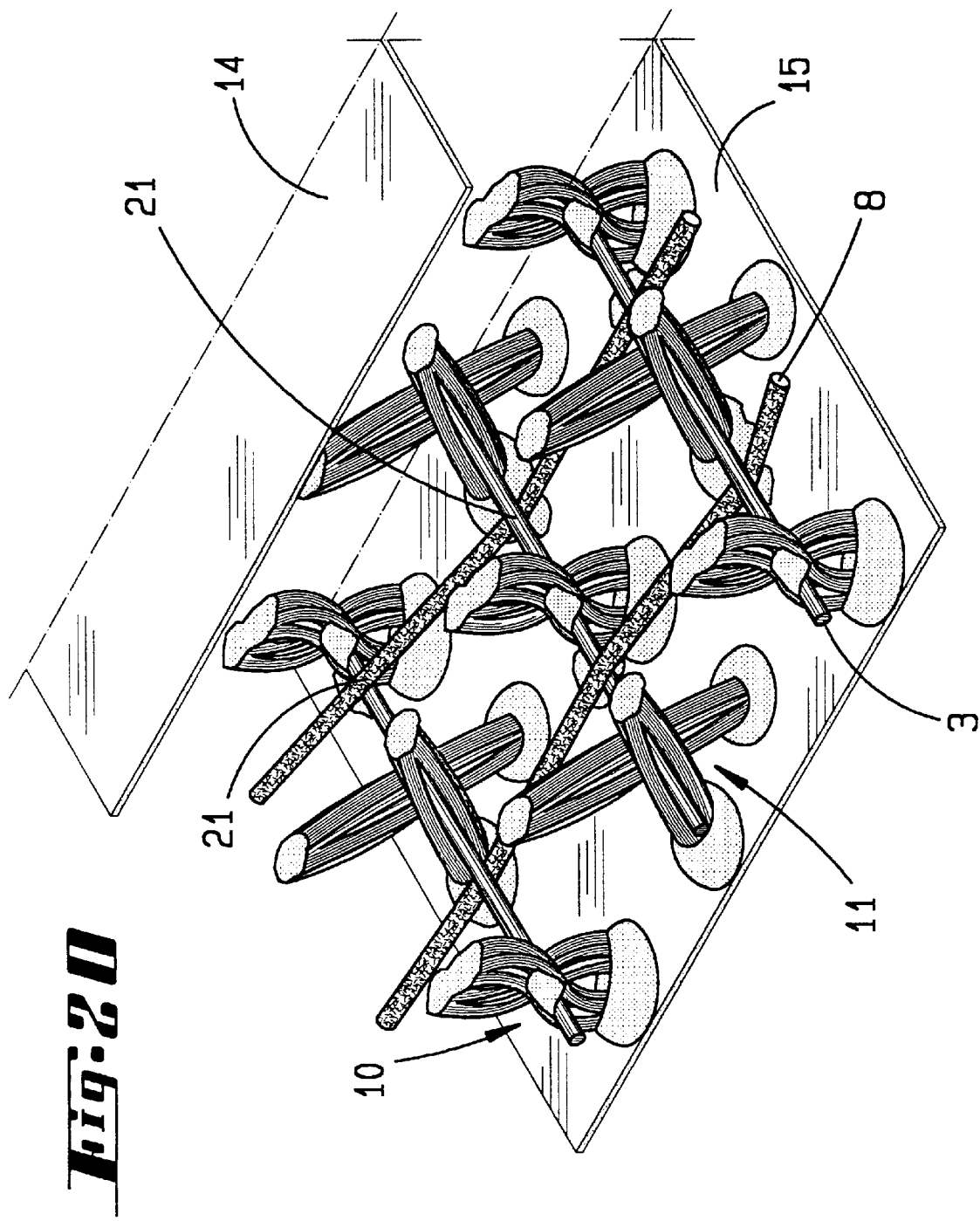
FIG. 20 shows a representation according to FIG. 19 of a building component according to FIG. 18.

The same is to be taken from the perspective representation according to FIG. 20.

For the sake of clarity, the representations of FIGS. 19 and 20 indicate only partially the resinification and associated connecting of the pile threads and the additional weft or additional warp threads. In a real building component, the resinification is thicker in particular at the cross-over points, and in general, the threads, in particular the additional warp threads and the additional weft threads, are resinified over their entire length, in the sense of the described covering 13 and 13'.

In so far as the intermediate bridges 12 are produced by means of the special yarns mentioned, such for example as protruding fibres, naps, loops or the like, the spacing and the length of the loops, naps or the like protruding individually from the cross-member threads (also to be designated as core threads) may be varied at will. The length should be sufficient to bridge over the space to the next cross-member thread.

Figure 21:
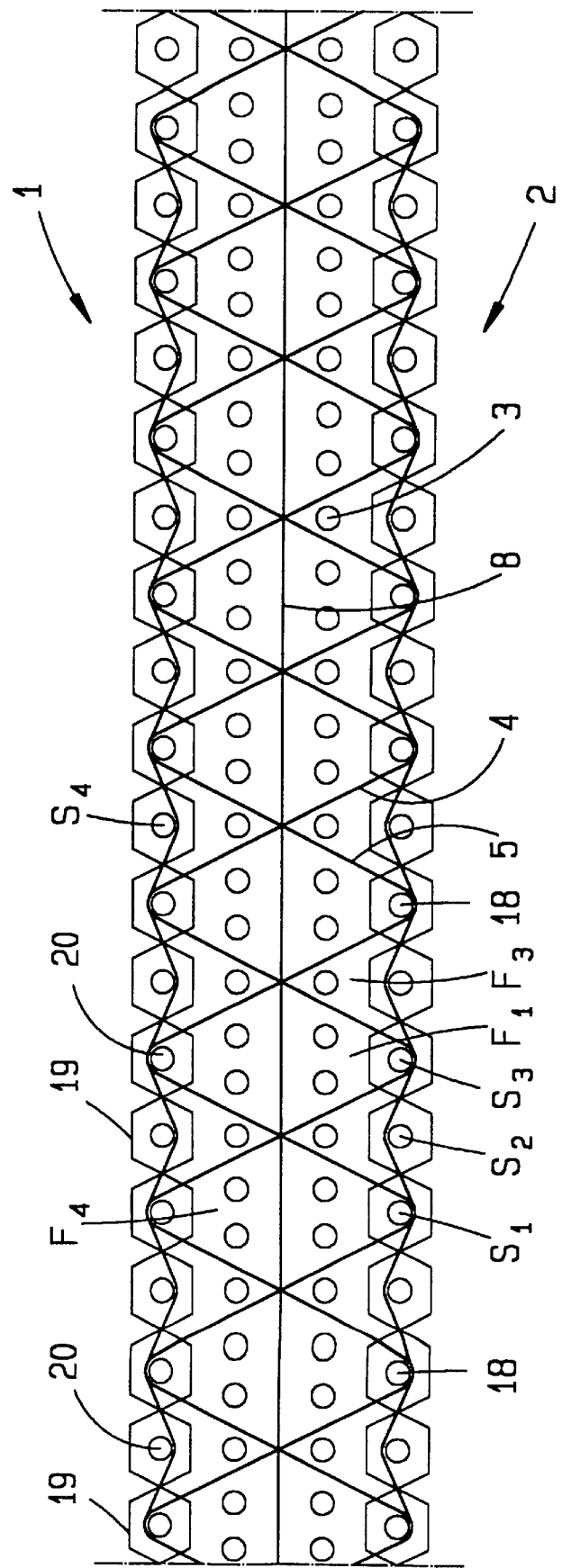
FIG. 21 shows a weaving scheme such as may be used in particular in connection with thermoplastic additional weft and/or additional warp threads.

In regard to the weaving scheme according to FIG. 21, it is to be mentioned in particular that there is provided here an additional warp thread 8 and that additional weft threads 3 are inserted into the sheds F1 and F2 thus formed—in cooperation with the floating pile threads 4, 5. These weft threads 3 are not woven in the weaving scheme shown in FIG. 21, but are merely introduced. It is of particular importance that threads of a thermoplastic material are here used. In principle, however, additional weft threads 3 may, also in this embodiment, be incorporated in the fabric by weaving. Insertion only has however advantages, for example with regard to the processing of different materials. In particular, thermoplastic threads are mentioned here. By means of this insertion between the two outside layers of the spacer fabric, there may be effected, on heating this spacer fabric, a resinification—by liquefaction of the thermoplastic threads—from the inside of the fabric outward. By introduction into the void space, this resinification may also be very favourably controlled. The two weft threads 3 in one shed F1 are merely a possible number. There may also be more weft threads 3 accommodated in a shed F1 or F2 such as this. Moreover, there are also more additional weft threads 3 accommodated in a shed F3, which is alone defined by the pile threads 4, 5 crossing one another. The additional warp thread 8 may also comprise such a thermoplastic fibre. This is dependent, however, on the desired stiffness of the resulting building component. It may also be recommended, in this case also, to produce the additional warp thread from a material like the main fabric, that is, in particular, from glass fibre.

It is further to be seen that a pile thread 4, 5 in the top or the bottom layer is always brought initially down around (or up around) a weft thread S1, then up around the next, S2, again down around the next but one, S3, and only then changes again to the other layer, with skipping of a weft thread S4.

FIGS. 22 to 24 show different weaves for the main warps, which may be combined with all of the weaving schemes represented.

It is of particular importance, in particular with regard to the weaving schemes of FIGS. 23 and 24, that the main warp threads of the first and second row, that is the ground warp threads of a layer, for example in accordance with the embodiments of FIGS. 23 and 24, may be arranged each one behind the other. There is produced as a result a partially open fabric surface, which shows good properties with regard to impregnatability of the fabric with resin. The bottom cloth shows the same ground weave.

Figure 25:
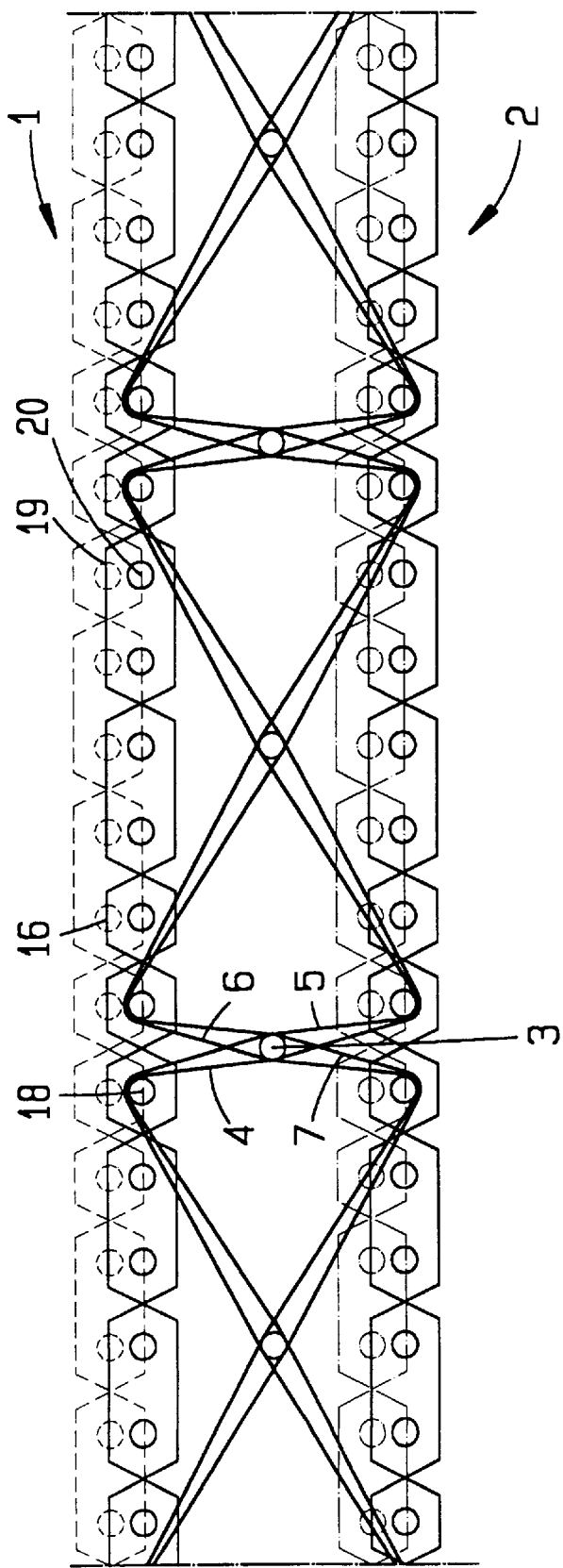
FIG. 25 shows a weaving scheme which has provided advantages in particular with regard to impregnatability of the fabric.
Figure 26:
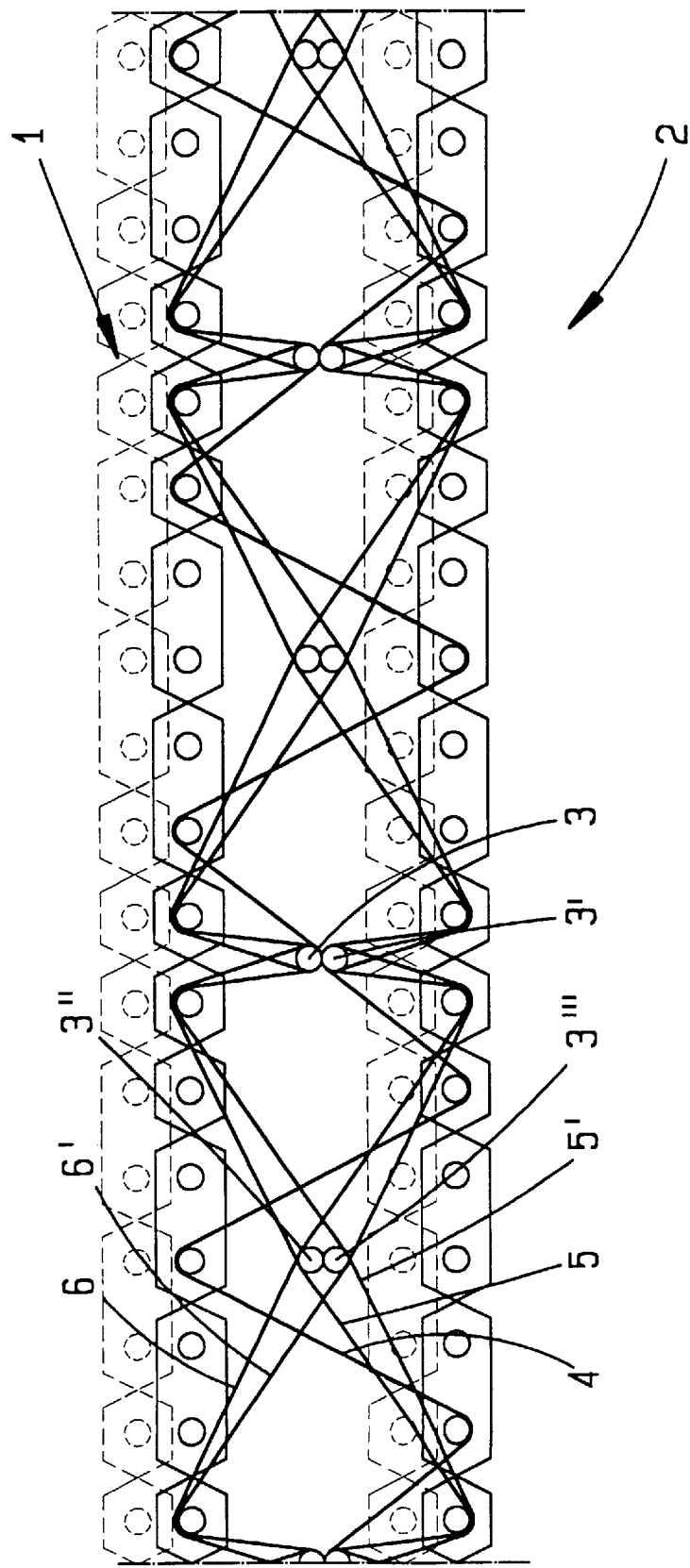
FIG. 26 shows a further weaving scheme which is of advantage with regard to impregnation with resin.

The foregoing is made clear with reference to the weaving schemes of FIGS. 25 to 27. The respective adjacently lying (in direction of depth, that is perpendicular to the plane of the drawing) ground warp is shown in dotted outline. Such a weave is at any rate of significance when, in conventional manner, a resinification is effected from outside. The sheds with a single weft thread in the top and the bottom layer respectively are in each case provided to be 3 in number, there being effected however in each case a connection of the pile threads, which alternate between the layers, only in regard to 2 weft threads in these sheds.

As for the rest, FIGS. 26 and 27 again show further possible variants with regard to the additional weft threads 3, or with regard to the arrangement of the pile threads 4, 5.

While one pile thread 4 alternates skipping respectively 3 and 4 weft threads in the bottom and the top layer respectively, and in doing so, with regard to the additional weft threads 3, 3', alternates only S-shaped between these additional weft threads, there are provided further pile threads 5, 5' and 6, 6', which, on the one hand, alternate between the layers with skipping of five weft threads in the top and the bottom layer respectively and then alternate from one to the other weft thread in the top and the bottom layer, and as well, in the first alternation, take up an interaction with additional weft threads 3", 3'", in that they hold these additional weft threads 3", 3'" in a tensioned shed between the pile threads 6, 6' and 5, 5', and on the other hand, enter into interaction with the additional weft threads 3, 3'.

In the manner described above, there is produced, as it were, a 3-layer spacer fabric (with reference to the additional weft threads and additional warp threads respectively), in which, however, the thread density of the "middle layer" is less than that of the top and the bottom layers. Preferably, one to six additional warp threads or additional weft threads per cm are woven into the "middle layer" in the weft direction.

In comparison with the structure of a bird bone as known from nature, there is achieved a sandwich construction, which provides very high strengths for relatively low weight.

The proportion of resin is preferably about 45 to 65% of the total weight of a building component produced in such manner, for example a panel.

Altogether, the compressive strength, the flexural strength and the shear strength are improved. Herewith are opened up fields of application which had hitherto long been reserved to sandwich materials which reached strength values such as these.

A subject of the invention is also a spacer fabric, in particular a velour fabric, with a first and a second layer and pile threads joining the layers, in which there is achieved an effective improvement having regard to adhesion to an outer side of the spacer fabric. In accordance with the invention, it is provided in this connection that in one or both layers, associated with an outer surface of the spacer fabric, there are woven in weft threads with a structured surface, for example loop yarns, frill yarns, textured yarns, etc.

Moreover, the invention also relates to a building component produced on the basis of such a fabric, produced namely by resinification. It is essential that these loop yarns, frill yarns, etc. define protruding portions which, in the resinified state, project beyond a top surface of the building component (or a bottom surface, or both surfaces). When a spacer panel produced from the fabric is, for example, provided on its surface with a plaster coat or the like, the protruding portions of the structured yarns define anchors, as it were, which penetrate freely into the plaster or any other layer. Moreover, the foregoing is naturally of advantage also when several panels of spacer fabrics are arranged on one other and joined, for example, by means of a hardened resin layer.

Reference is made in this connection to FIGS. 28, 29, 30 and 31.

In FIG. 28, there is represented the fundamental weaving scheme of a velour spacer fabric. In the embodiment of FIG. 28, there is woven into the top fabric layer an additional warp thread 25, which is joined by weaving technique to an additional weft thread 26. The additional weft thread 26 is formed as a weft thread with a structured surface, for example in the form of a special twist like a loop yarn, a fancy yarn, a textured yarn, etc. Optionally, the additional warp threads 25 may also be formed with such a surface. Moreover, it is also possible, in principle, not to provide additional warp threads 25 or additional weft threads 26, but rather to directly form the corresponding threads of the ground fabric in this manner. The additional weft threads and additional warp threads have however the advantage that use may also be made of materials different from the ground fabric. For example, the threads may comprise not only glass fibres, carbon fibres and aramide fibres, but also polyester material, polyamide material and polypropylene material. Moreover, the threads may also be formed as continuous or staple fibres. It is also further possible to use natural woven textile materials for this purpose.

In FIG. 29, there is represented such a weaving scheme with different weaves of the top and the bottom layer, which again, as explained in principle above with reference to FIGS. 25 to 27, may be arranged one behind the other (in depth). The weaving scheme of FIG. 29 otherwise corresponds to that for a conventional velour fabric.

Figure 30:
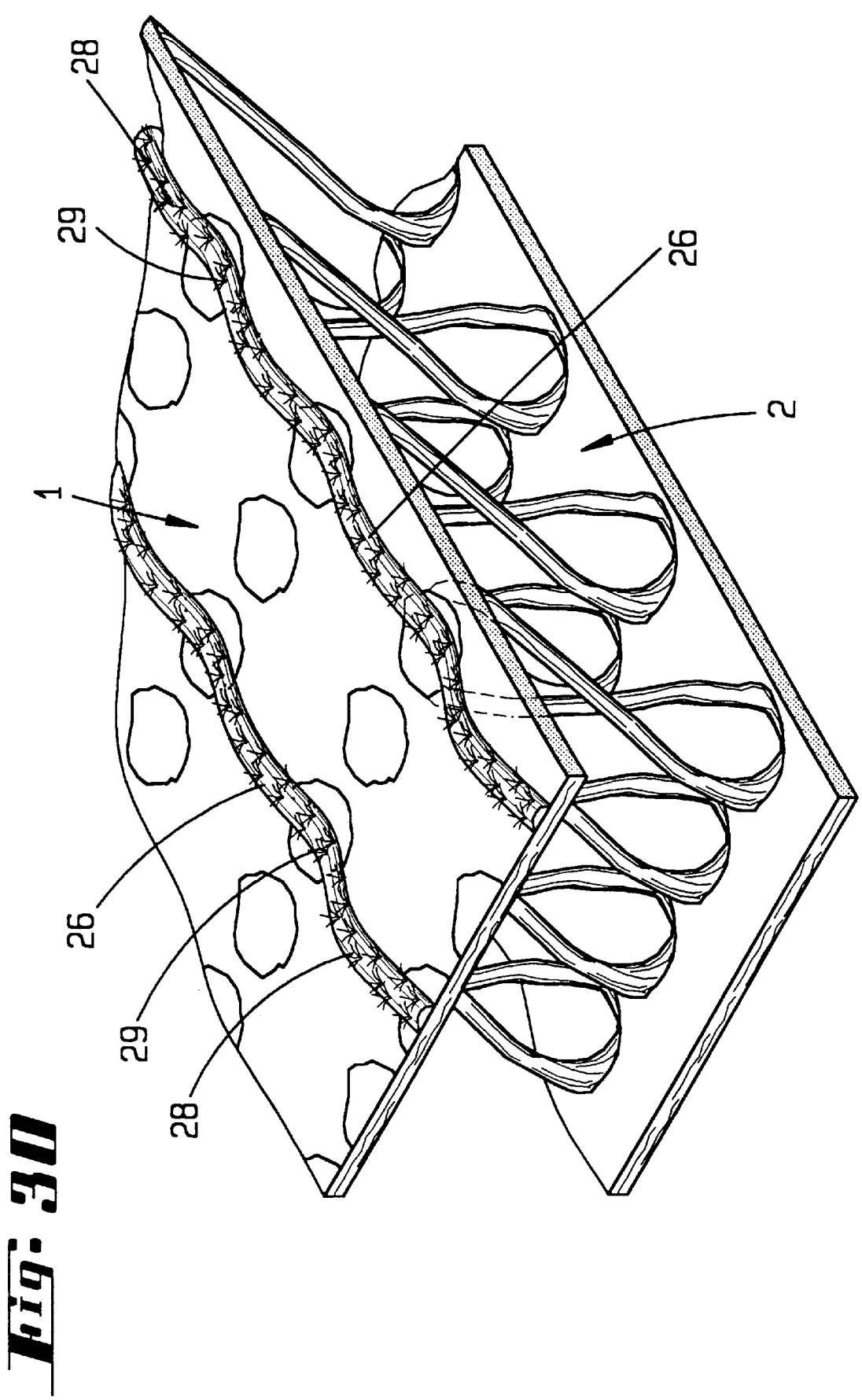
FIG. 30 shows a resinified building component produced on the basis of a fabric according to FIG. 28, in partially cut-away perspective view.
Figure 31:
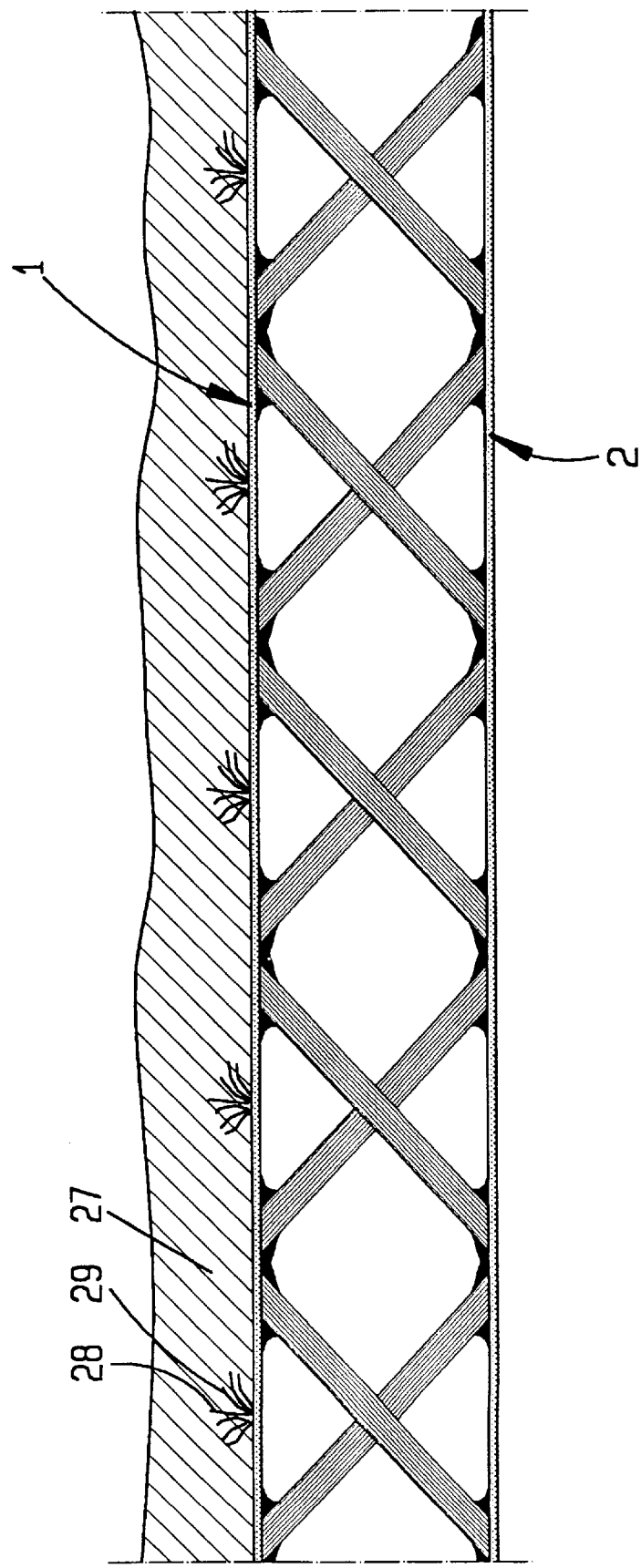
FIG. 31 shows a building component according to FIG. 30, in cross-section, provided with a top coat of plaster.

In FIG. 30, there is represented in perspective view a building component produced by the foregoing, after resinification. Moreover, there is represented in FIG. 31, in diagrammatic manner, a cross-section through a building component of such a kind with a plaster coat 27 applied on top. It is to be recognised that protruding portions 28, 29 of the additional weft threads project into the plaster coat 27 and thus provide a firm anchorage between the resinified building component and the plaster coat.

What is claimed is:

1. A spacer fabric, especially a velour fabric, having: a first layer comprising weft threads; and a second layer comprising weft threads; and pile threads each alternating from one single weft thread in one of said layers to another single weft thread in the other of said layers and sequentially to other single weft threads in respective ones of the layers joining the layers together, and skipping adjacent weft threads between the single weft threads in bottom layer and top layer respectively without engaging the adjacent weft threads in each layer.

2. A spacer fabric according to claim 1, wherein, between the layers and joined to or starting from freely floating pile threads, there are formed branches running in weft and/or warp direction, and said branches start from or are joined to a ground warp and/or a weft material.

3. A spacer fabric, especially a velour fabric, having a first layer and a second layer and pile threads joining the layers together, wherein one pile thread alternates skipping respectively several weft threads in bottom layer and top layer respectively, further comprising further pile threads, which alternate between the layers with skipping of several weft threads in the top layer and in the bottom layer respectively, and alternate also from one to the other weft thread in the top layer and bottom layer, and wherein the threads are textured.

4. A spacer fabric, especially a velour fabric, having a first layer and a second layer and pile threads joining the layers together, wherein one pile thread alternates skipping respectively several weft threads in bottom layer and top layer respectively, further comprising further pile threads alternate between the layers with skipping of several weft threads in the top layer and in the bottom layer respectively, and alternate also from one to the other weft thread in the top layer and bottom layer, and wherein the threads are formed by fancy twist method.

5. A spacer fabric, especially a velour fabric, having a first layer and a second layer and pile threads joining the layers together, wherein one pile thread alternates skipping respectively several weft threads in bottom layer and top layer respectively, further comprising further pile threads alternate between the layers with skipping of several weft threads in the top layer and in the bottom layer respectively, and alternate also from one to the other weft thread in the top layer and bottom layer, and further comprising additional weft threads between said layers which are fixed by said pile threads alternating from above to below and below to above before and after the weft threads.

6. A spacer fabric, especially a velour fabric, having a first layer and a second layer and pile threads joining the layers together, wherein one pile thread alternates skipping respectively several weft threads in bottom layer and top layer respectively, further comprising further pile threads alternate between the layers with skipping of several weft threads in the top layer and in the bottom layer respectively, and alternate also from one to the other weft thread in the top layer and bottom layer, wherein in one or both layers, associated with an outer surface of the spacer fabric, there are woven in additional weft threads having a structured surface.

7. A spacer fabric according to claim 6, further wherein additional warp threads used for the securing of the additional weft threads are provided in a layer of the spacer fabric having a structured surface.

8. A spacer fabric, especially a velour fabric, having a first layer and a second layer and pile threads joining the layers together, wherein one pile thread alternates skipping respectively several weft threads in bottom layer and top layer respectively, further comprising further pile threads alternate between the layers with skipping of several weft threads in the top layer and in the bottom layer respectively, and alternate also from one to the other weft thread in the top layer and bottom layer, wherein the top and the bottom layers are woven from a technical fibre, and there are provided, between the layers and optionally joined to a freely floating region of the pile threads, additional weft threads and/or additional warp threads which comprise a thermoplastic material.

9. A spacer fabric, especially a velour fabric, having a first layer and a second layer and pile threads joining the layers together, wherein one pile thread alternates skipping respectively several weft threads in bottom layer and top layer respectively, further comprising further pile threads alternate between the layers with skipping of several weft threads in the top layer and in the bottom layer respectively, and alternate also from one to the other weft thread in the top layer and bottom layer, wherein the several weft threads are five.

10. A spacer fabric, in especially a velour fabric, having a first layer and a second layer and pile threads joining the layers together, further comprising branches between the layers and joined to or starting from freely floating said pile threads, said branches running in weft and/or warp direction, said branches, in so far as they are woven, are woven into a cross-over region of the pile threads, by which a free length of the pile threads is in each case approximately halved.

11. A spacer fabric according to claim 10, wherein in that the branches are formed by projecting fibres.

12. A spacer fabric according to claim 10, wherein in that the branches are formed by naps provided on the threads.

13. A spacer fabric according to claim 10, wherein in that the branches are formed by loops provided on the threads.

14. A spacer fabric according to claim 10, wherein the branches start from or are joined to a ground warp and/or weft material.

15. A building component on basis of a spacer fabric, especially on the basis of a spacer fabric according to claim 10, the building component comprising at least one first and one second layer and intermediate elements linking said at least one first and second layers, wherein the fabric comprises a technical yarn, and is resinified-hardened, and the intermediate elements form rigid spacing elements for the at least one first and second layers, and branch elements having their origin in the intermediate elements defined by the freely floating pile threads of the spacer fabric, and said branch elements are substantially laterally oriented.

16. A building component according to claim 15, wherein said technical yarn is made of fibers selected from the group consisting of aramide fibers, ceramic fibers, carbon fibers and glass fibers.

17. A building component according to claim 15, wherein said branch elements form intermediate bridges to a neighboring intermediate element.

18. A building component according to claim 17, wherein the basis for the intermediate bridges are naps, loops or the like provided on the threads.

19. A building component on basis of a spacer fabric, especially on the basis of a spacer fabric, especially a velour fabric, having a first layer and a second layer and pile threads joining the layers together, wherein one pile thread alternates skipping respectively several weft threads in bottom layer and top layer respectively, further comprising further pile threads alternate between the layers with skipping of several weft threads in the top layer and in the bottom layer respectively, and alternate also from one to the other weft thread in the top layer and bottom layer, the building component comprising at least one first and one second layer and intermediate elements linking said at least one first and second layers, wherein the fabric comprises a technical yarn, and is resinified-hardened, and the intermediate elements form rigid spacing elements for the at least one first and second layers, and branch elements having their origin in the intermediate elements defined by freely floating said pile threads of the spacer fabric, and said branch elements are substantially laterally oriented.

20. A building component according to claim 19, wherein the basis for an intermediate bridge is an additional weft thread.

21. A building component according to claim 19 or more of the preceding claims or especially according, wherein the intermediate elements are formed to be of double figure-eight shape.

22. A building component according to claim 19, wherein the intermediate elements are defined by intermediate cross-members running cross-shaped into one another, wherein each intermediate cross-member comprises a double structure leaving a gap.

23. A building component according to claim 19, wherein said technical yarn is made of fibers selected from the group consisting of aramide fibers, ceramic fibers, carbon fibers and glass fibers.

24. A building component according to claim 19, wherein said branch elements form intermediate bridges to a neighboring intermediate element.

25. A building component according to claim 24, wherein the basis for an intermediate bridge is an additional warp thread.

26. A building component according to claim 24, wherein the basis for the intermediate bridges are naps, loops or the like provided on the threads.

27. A method for the formation of a building component on the basis of a spacer fabric, especially on the basis of a velour fabric, in which by resinification there is achieved a spaced, substantially rigid construction, wherein the resinification is executed by the melting of additional thermoplastic fibres introduced into or woven into the matrix of the spacer fabric.

28. A method according to claim 18, wherein the additional fibres introduced are located between layers of the spacer fabric, in the region of freely floating pile threads.

29. A method according to claim 18, wherein there is effected a resinification of fabric by melting of the additional thermoplastic fibres disposed between the layers of the spacer fabric from the inside of the spacer fabric.

* * * * *